United States Patent
Zhu et al.

(10) Patent No.: US 12,014,372 B2
(45) Date of Patent: Jun. 18, 2024

(54) TRAINING A RECURRENT NEURAL NETWORK MACHINE LEARNING MODEL WITH BEHAVIORAL DATA

(71) Applicant: PayPal, Inc., San Jose, CA (US)

(72) Inventors: Rongsheng Zhu, Shanghai (CN); Dmitry Martyanov, Santa Clara, CA (US); Xiuyi Ling, Shanghai (CN)

( * ) Notice: Subject to any disclaimer, the term of this patent is extended or adjusted under 35 U.S.C. 154(b) by 0 days.

(21) Appl. No.: 16/903,158

(22) PCT Filed: Jun. 16, 2020

(86) PCT No.: PCT/CN2020/096341
§ 371 (c)(1),
(2) Date: Jun. 16, 2020

(87) PCT Pub. No.: WO2021/253223
PCT Pub. Date: Dec. 23, 2021

(65) Prior Publication Data
US 2023/0111652 A1    Apr. 13, 2023

(51) Int. Cl.
*G06Q 20/00* (2012.01)
*G06Q 20/10* (2012.01)
*G06Q 20/40* (2012.01)

(52) U.S. Cl.
CPC ....... *G06Q 20/4016* (2013.01); *G06Q 20/102* (2013.01)

(58) Field of Classification Search
CPC .............................................. G06Q 20/4016
See application file for complete search history.

(56) References Cited

U.S. PATENT DOCUMENTS

| | | | |
|---|---|---|---|
| 11,210,673 B2* | 12/2021 | Li | G06N 3/088 |
| 2002/0082886 A1* | 6/2002 | Manganaris | G06F 21/552 |
| | | | 719/318 |
| 2013/0123003 A1* | 5/2013 | Williams | A63F 13/85 |
| | | | 463/29 |
| 2017/0262852 A1* | 9/2017 | Florimond | G06Q 20/389 |

(Continued)

FOREIGN PATENT DOCUMENTS

| | | |
|---|---|---|
| CN | 109345260 A | 2/2019 |
| CN | 109410036 A | 3/2019 |

(Continued)

OTHER PUBLICATIONS

A Multiperspective Fraud Detection Method for Multiparticipant E-Commerce Transactions, IEEE (Year: 2023).*

(Continued)

*Primary Examiner* — Bruce I Ebersman
(74) *Attorney, Agent, or Firm* — Haynes and Boone, LLP; Eric Li

(57) ABSTRACT

Event data of a first entity is accessed. The first entity has been flagged as having a predefined status. The event data corresponds to a plurality of events involving the first entity that occurred within a predefined first time period. Based on the accessing of the event data, behavioral data of the first entity is generated. The behavioral data is formatted as a data sequence. A machine learning model is trained using the behavioral data of the first entity as training data. Using the trained machine learning model, a determination is made as to whether a second entity has the predefined status.

20 Claims, 11 Drawing Sheets

(56) References Cited

U.S. PATENT DOCUMENTS

| | | | |
|---|---|---|---|
| 2019/0287114 A1 | 9/2019 | Li | |
| 2021/0004949 A1* | 1/2021 | Broyda | G06V 30/224 |
| 2021/0103926 A1* | 4/2021 | Wu | G06N 20/00 |
| 2021/0200955 A1* | 7/2021 | Ben Kimon | G06N 3/044 |
| 2021/0312528 A1* | 10/2021 | Benkreira | G06Q 20/34 |
| 2021/0326436 A1* | 10/2021 | West | G06F 21/567 |

FOREIGN PATENT DOCUMENTS

| | | |
|---|---|---|
| CN | 110084610 A | 8/2019 |
| CN | 110347724 A | 10/2019 |
| WO | 2019028089 A1 | 2/2019 |

OTHER PUBLICATIONS

Security in EServices and Applications IEEE (Year: 2007).*
On Privacy Aware Carriers for Value-Possessed e-Invoices Considering Intelligence Mining, IEEE 2020 (Year: 2020).*
Solution architecture for financial institutions to handle illegal activities: a neural networks approach, IEEE 2004 (Year: 2004).*

* cited by examiner

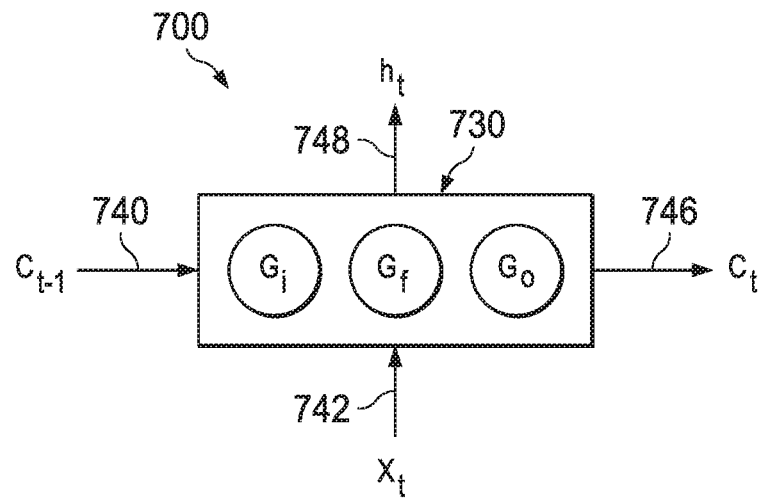
Fig. 7B
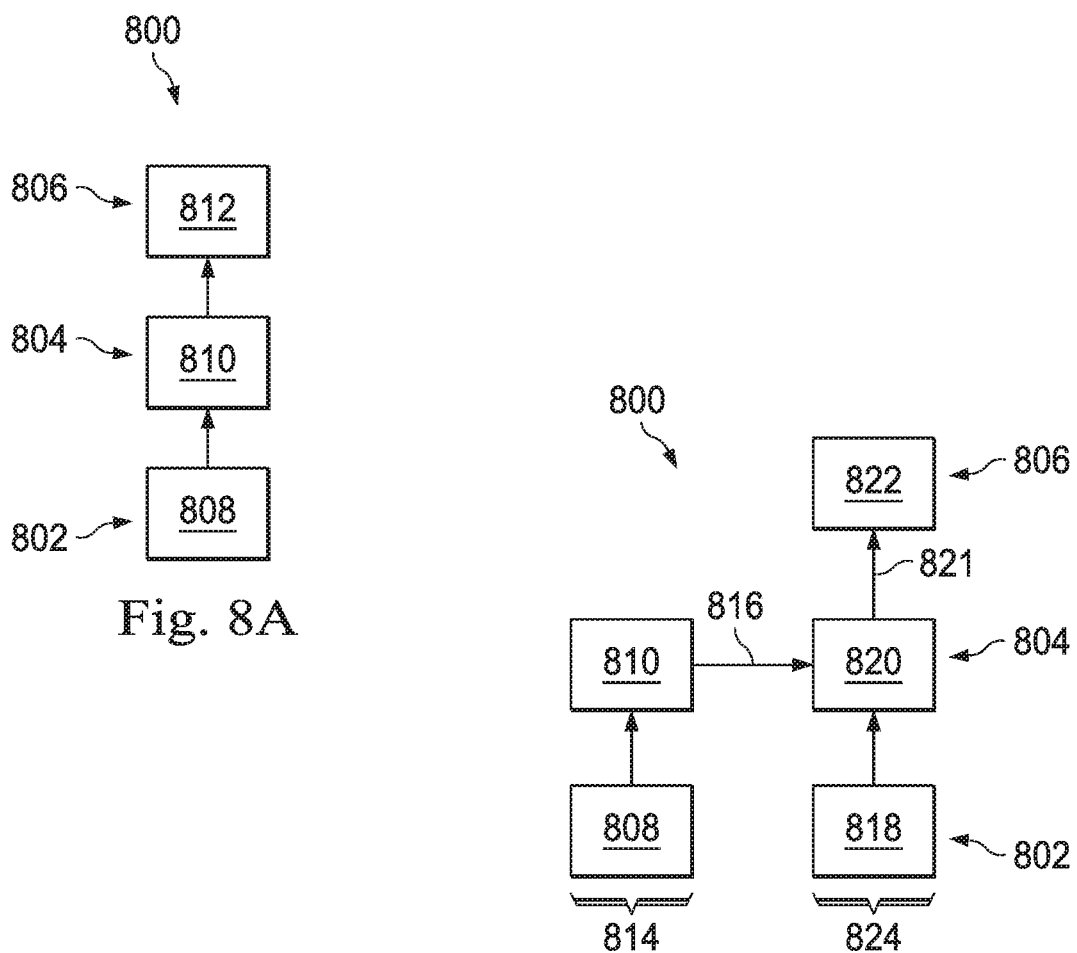
Fig. 8A
Fig. 8B

TRAINING A RECURRENT NEURAL NETWORK MACHINE LEARNING MODEL WITH BEHAVIORAL DATA

PRIORITY DATA

The present application claims priority to PCT application No. PCT/CN2020/096341, filed on Jun. 16, 2020, entitled "Training A Recurrent Neural Network Machine Learning Model With Behavioral Data", the disclosure of which is hereby incorporated by reference herein in its entirety.

BACKGROUND

Field of the Invention

The present application generally relates to machine learning. More particularly, the present application involves using behavioral data to train a Recurrent Neural Network (RNN) machine learning model, such as a Long Short-Term Memory (LSTM) model, and then using the trained RNN machine learning model to make predictions.

Related Art

Rapid advances have been made in the past several decades in the fields of computer technology and telecommunications. As a result, these advances allow more and more interactions to be conducted electronically. For example, electronic online transaction platforms such as PAYPAL™, VENMO™, EBAY™, AMAZON™ or FACEBOOK™ allow their users to conduct transactions with other users, other entities, or institutions, such as making peer-to-peer transfers, making electronic payments for goods/services purchased, etc. In the course of conducting these transactions, a user may exhibit certain types of behaviors. However, conventional systems and methods have not been able to leverage a user's behavioral data to train Recurrent Neural Network (RNN) machine learning models, or more particularly, a Long Short-Term Memory (LSTM) model, which is a specific type of RNN model. As a result, conventional systems and methods have not been able to take more advantage of the capabilities of RNN or LSTM machine learning processes to make more accurate predictions involving users.

BRIEF DESCRIPTION OF THE FIGURES

FIGS. 7A-7B and 8A-8E illustrate various types of neural networks for machine learning according to various aspects of the present disclosure.

Figure 1:
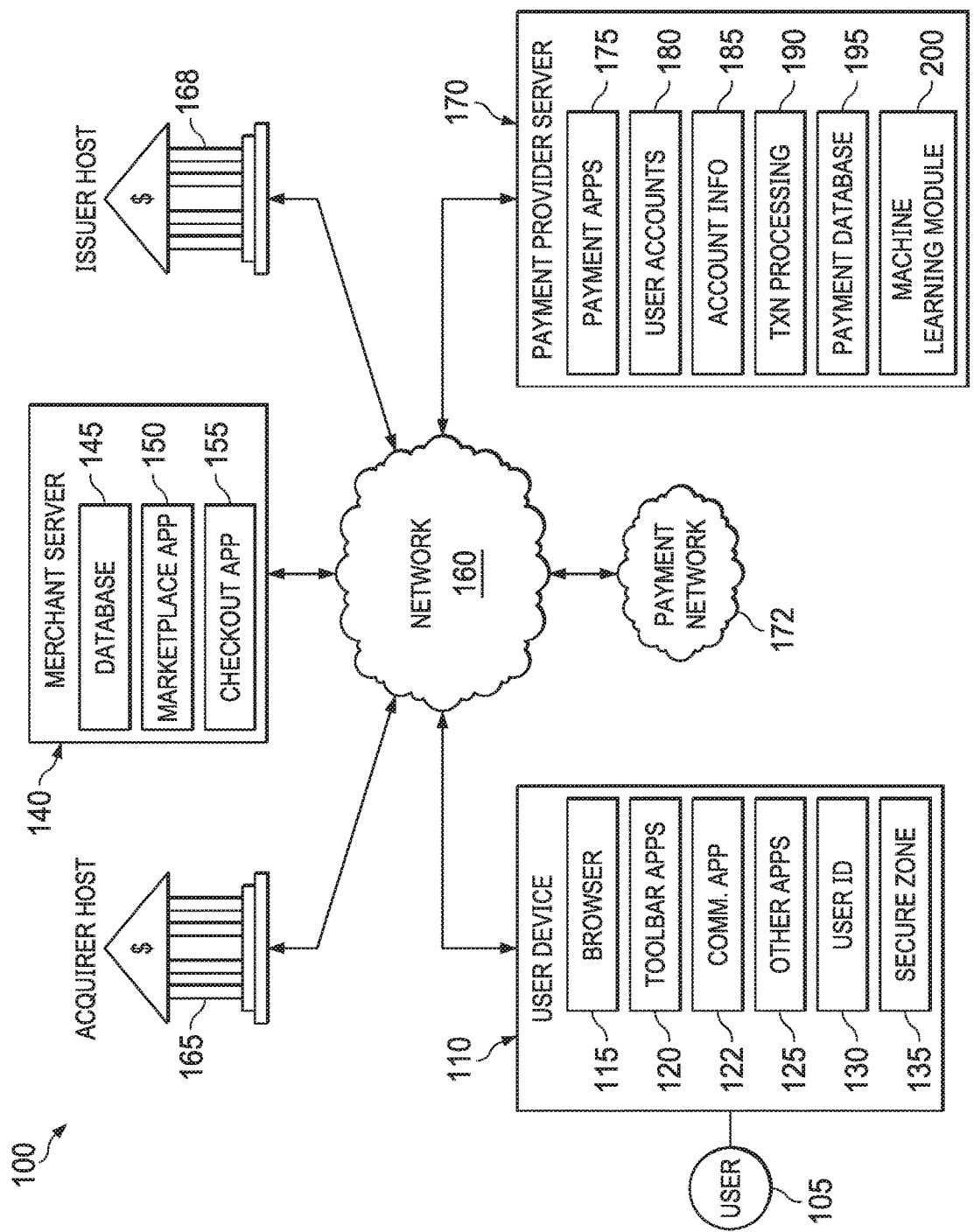
FIG. 1 is a block diagram of a networked system according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to using behavioral data of an entity for machine learning. Recent advances in computer science have led to the popularization of machine learning, which is an application of artificial intelligence that provides systems the ability to automatically learn and improve from experiences without being explicitly programmed. Among other things, machine learning can be used to make certain types of predictions, such as presence of fraud in a transaction. However, different types of machine learning techniques may require different types of input data (e.g., for model training), and the type of input data that works for one type of machine learning technique may not be suitable for other types of machine learning techniques. For example, a Convolutional Neural Network (CNN) type of machine learning technique may need a two-dimensional input (e.g., an image) as its input, a Gradient Boosting type of machine learning technique may need data taken at a certain snapshot in time, and a Recurrent Neural Network (RNN) type of machine learning technique may need sequential information (e.g., a sequence of data where the data elements in the sequence depend from one another) as its input. The inventors of the present disclosure have come to recognize the fact that using a RNN model with sequential information makes it a particularly attractive candidate for fraud prediction in situations where the behavioral history (e.g., including a sequence of events) of the parties involved in a transaction can be extracted and analyzed. Unfortunately, conventional machine learning systems have not been able to take full advantage of RNN models in the relevant contexts.

The present disclosure trains a RNN model with behavioral data of an entity, and then uses the trained RNN model to make predictions, for example with respect to fraud. For example, unlike conventional systems that rely on data captured at a single snapshot in time, the present disclosure gathers behavioral information of a first entity (e.g., a seller or merchant on an electronic transaction platform), where the behavioral information may include information pertaining to a sequence of events involving previous transactions of the first entity. The first entity has already been flagged with a predefined status, such as a status of fraud at an account level.

The behavioral information is then used to generate a data sequence, for example, in the form of a sequence of event codes. Each event code may be assigned a value that indicates the features or characteristics of the corresponding event, such as an average transaction price, a payment flow used, whether the transaction is peer-to-peer, whether the transaction was authorized, etc. The data sequence is then used to train an RNN machine learning model, for example, a Long Short-Term Memory (LSTM) model as a specific implementation of the RNN model.

Once the RNN model is trained, it may be used to make predictions involving other entities. For example, a second entity may request to conduct a transaction. In response to such a request, the behavioral information of the second entity is collected, and a data sequence similar to the one generated for the first entity is also generated for the second entity based on the behavioral information of the second entity. The data sequence of the second entity is inputted to the RNN model, which then produces an output that indicates whether the second entity or the transaction involving the second entity is fraudulent. The various aspects of the present disclosure are discussed in more detail with reference to FIGS. 1-11.

FIG. 1 is a block diagram of a networked system 100 or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal™, Inc. of San Jose, CA A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. User device 110 may also include other applications 125, for example the mobile applications that are downloadable from the App-store™ of APPLE™ or GooglePlay™ of GOOGLE™.

In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials or other data that may warrant a more secure or separate storage, including various data as described herein.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

According to various aspects of the present disclosure, the merchant server 140 may also host a website for an online marketplace, where sellers and buyers may engage in purchasing transactions with each other. The descriptions of the items or products offered for sale by the sellers may be stored in the database 145. For example, the descriptions of the items may be generated (e.g., by the sellers) in the form of text strings. These text strings are then stored by the merchant server 140 in the database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, a machine learning module 200 may also be implemented on the payment provider server 170. The machine learning module 200 may include one or more software applications or software programs that can be automatically executed (e.g., without needing explicit instructions from a human user) to perform certain tasks. For example, the machine learning module 200 may electronically access one or more electronic databases (e.g., the database 195 of the payment provider server 170 or the database 145 of the merchant server 140) to access or retrieve electronic data about users, such as the user 105. The retrieved electronic data may contain event data, which may pertain to various historical events involving the user. For example, the event data for each event may indicate event features, such as whether the price/amount of a transaction conducted by the user, whether the transaction is a peer-to-peer transaction, the payment flow of the transaction, was the transaction authorized, etc. The event data may be formatted as a sequence of event codes, where each event code has a value that corresponds to a unique combination of different event features. The sequence of event codes for users who already have been flagged with a predefined status (e.g., fraud) may be inputted to an RNN machine learning model (e.g., an LSTM model) to train the model. After the RNN model has been trained, it may be used to automatically make predictions with respect to the predefined status for other users.

Based on the above, the machine learning module 200 can automate decision-making processes such as fraud determination involving users. Using state-of-the-art machine learning techniques such as RNN (e.g., LSTM), the machine learning module 200 may quickly and automatically determine whether a user's actions may be fraudulent based on the user's most recent or current behavior sequence, which is more accurate, since a user's behavior may change over time. In contrast, conventional systems and methods make these types of decisions either not based on machine learning at all, or use other machine learning models that rely on data that corresponds to a single point in time (to the extent that machine learning is used at all). Compared to the conventional systems and methods, the systems and methods described in present disclosure offer greater accuracy, since a user's behavior may be changing dynamically, which is fully taken into account by the RNN models of the present disclosure but not by conventional systems and methods. As such, the RNN modeling of the present disclosure offers an improvement in computer technology.

It is noted that although the machine learning module 200 is illustrated as being separate from the transaction processing application 190 in the embodiment shown in FIG. 1, the transaction processing application 190 may implement some, or all, of the functionalities of the machine learning module 200 in other embodiments. In other words, the machine learning module 200 may be integrated within the transaction processing application 190 in some embodiments. In addition, it is understood that the machine learning module 200 (or another similar program) may be implemented on the merchant server 140, on a server of any other entity operating a social interaction platform, or even on a portable electronic device similar to the user device 110 (but may belong to an entity operating the payment provider server 170) as well. It is also understood that the machine learning module 200 may include one or more sub-modules that are configured to perform specific tasks. For example, the machine learning module 200 may include a first sub-module configured to train the machine learning model, as well as a second sub-module configured to make predictions based on the trained model.

Still referring to FIG. 1, the payment network 172 may be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
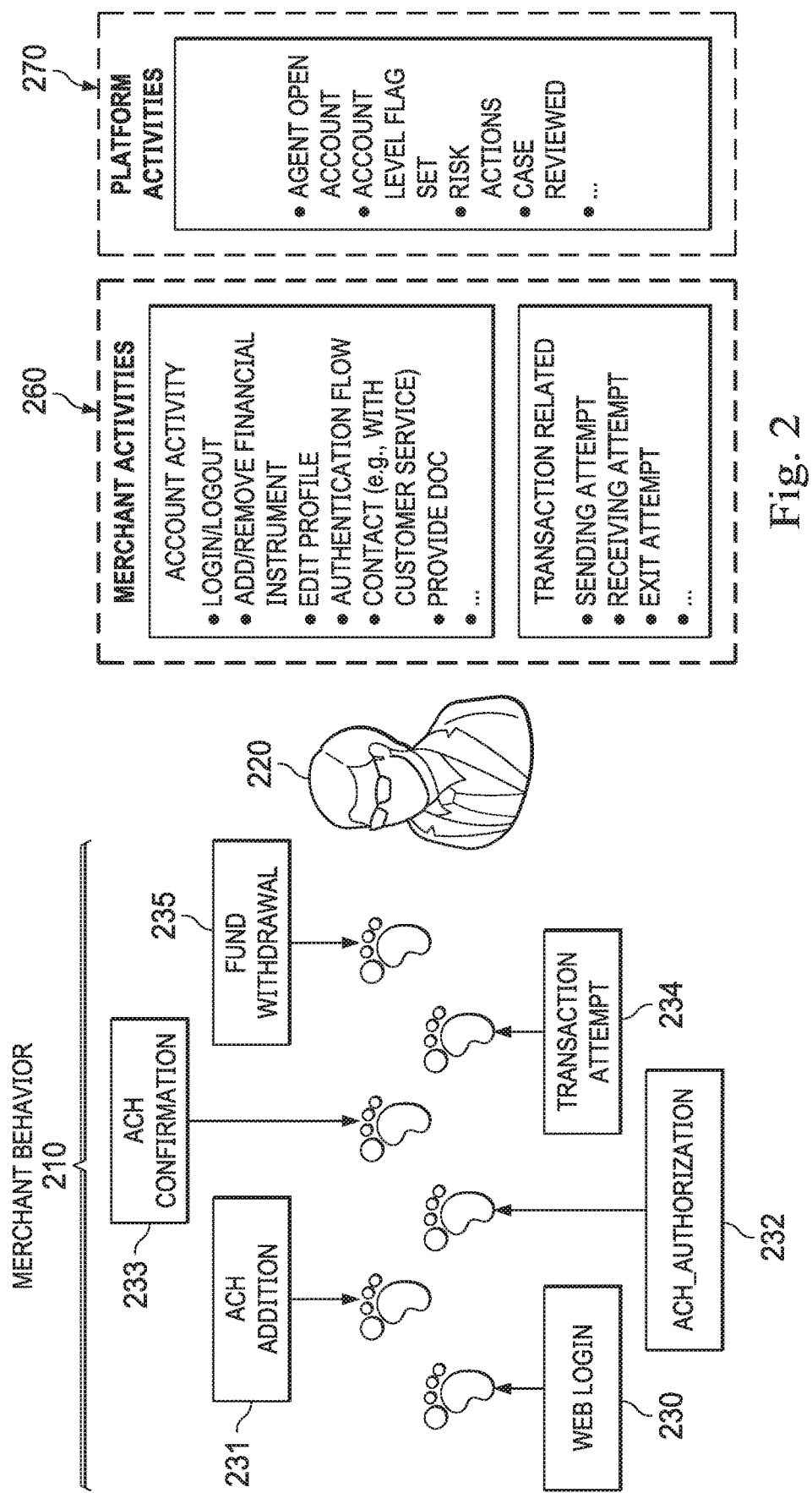
FIG. 2 illustrates various types of activities or events as a part of a user's behavior according to various aspects of the present disclosure.

FIG. 2 illustrates various types of example activities that can be analyzed as behavioral data of an entity. For example, FIG. 2 illustrates the behavior 210 of a merchant 220, which is used to represent the entity whose behavioral data can be analyzed via machine learning. The merchant 220 may be a merchant that sells goods or services on an electronic transaction platform, such as EBAY™ or AMAZON™. The terms of seller and merchant may be used interchangeably hereinafter. As shown in FIG. 2, the merchant behavior 210 includes the following activities or events:

1. A web login event 230. For example, the merchant 220 may use a username and a password to log in to the electronic transaction platform;
2. An ACH addition event 231. For example, the merchant 220 may add (over the web) an Automated Clearing House (ACH) account to be associated with the merchant 220's account with the electronic transaction platform. ACH is a network that coordinates electronic payments and automated money transfers and allows an entity such as the merchant 220 to move money between banks without using paper checks, wire transfers, credit card networks, or cash.
3. An ACH Authorization event 232. The merchant 220 may authorize another entity (e.g., a company, a landlord, or a financial institution such as the electronic transaction platform herein) to automatically deduct funds from the account of the merchant 220, where the funds may be deducted during regular intervals such as in monthly cycles.
4. An ACH confirmation event 233. The electronic transaction platform may send confirmation to the merchant 220 that the ACH added by the merchant 220 has been successfully confirmed.
5. A transaction attempt event 234. The electronic transaction platform may receive an attempt from the merchant 220 to conduct a transaction, for example, an attempt to sell one or more products or services via the electronic transaction platform. Characteristics or features about the attempted transaction may also be included in this event. For example, the characteristics or features may include whether the attempted transaction is a peer-to-peer transaction, the average selling price of the goods/services involved in the attempted transaction, etc.
6. A fund withdrawal event 235. The merchant 220 may withdraw the funds in its account. Characteristics or features about this event may include the amount withdrawn, the length of time between the withdrawal and a previous transaction or transaction attempt, etc.

It is understood that the activities or events of the merchant behavior 210 are merely a small subset of the different types of activities or events that can be analyzed as a part of the merchant behavior 210. For example, additional merchant activities 260 may include activities related to an account of the merchant, such as a login or a logout attempt, an addition or a removal of a financial instrument (FI) (e.g., checking account, savings account, credit card number, etc.), an edit of a merchant profile, an authentication flow, a contact with other entities such as with a customer service representative of the electronic transaction platform, or a providing of certain documents. The additional merchant activities 260 may also include activities related to one or more transactions, such as an attempt to send funds, a receiving of funds, an attempt to exit out of the transaction, etc.

The above activities are example activities that may be initiated or triggered by a merchant. In addition, the activities that can be analyzed as a part of the behavioral data of the merchant 220 may include activities performed by the electronic transaction platform. As non-limiting examples, platform activities 270 may include using an agent to open an account for the merchant 220, setting an account level flag (e.g., trustworthy user or fraudulent user) for the merchant 220, performance of risk actions (e.g., risk analysis actions or risk mitigation actions on the merchant 220), or reviewing cases associated with the merchant 220, etc. It is also understood that although the discussions pertain to a merchant or seller on the electronic transaction platform, the same is true for a buyer on the electronic transaction platform. In other words, the activities of a buyer may be retrieved and analyzed to generate buyer behavioral data, which may then be used to train an RNN model.

Figure 3:
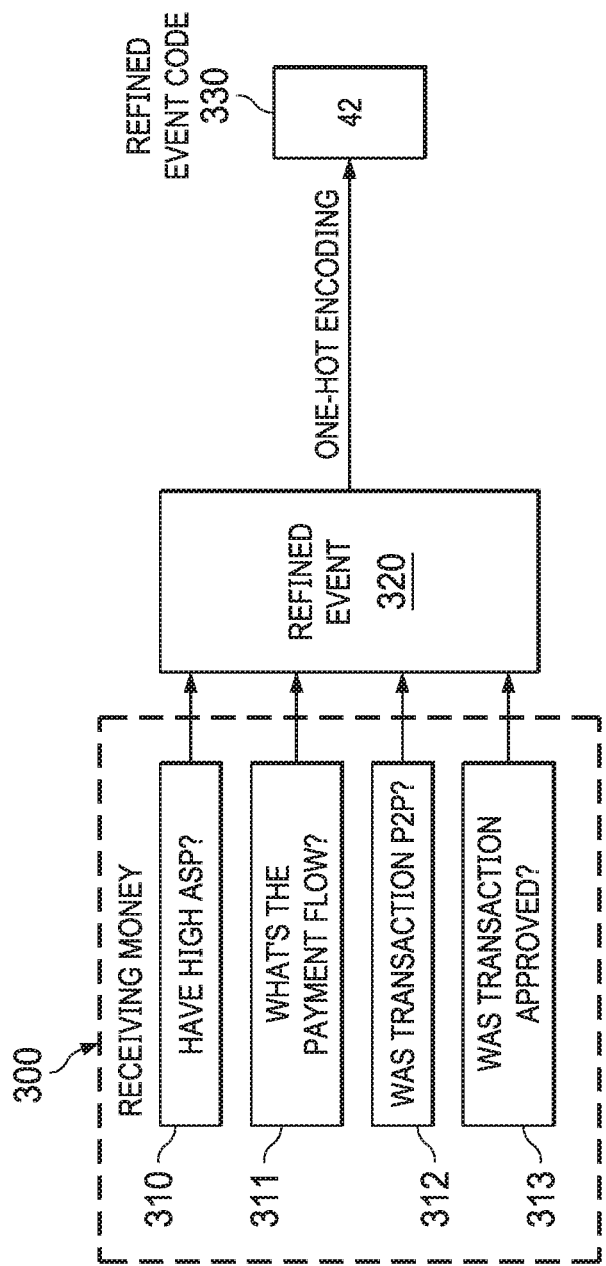
FIG. 3 illustrates a process of generating an event code according to various aspects of the present disclosure.

Before the behavioral data of a merchant or a buyer can be used to train the RNN model, the behavioral data may be compressed or otherwise reconfigured to generate refined event codes as a data sequence according to various aspects of the present disclosure. FIG. 3 provides a visual illustration of a generation of an example refined event code for a merchant. For example, an event 300 may be the merchant receiving money, which took place in the past for the merchant. The various features of the event 300 may be extracted as a part of the behavioral data of the merchant.

FIG. 3 illustrates features 310-313 as example features of the event 300. The feature 310 pertains to whether the event 300 has a high average selling price (ASP). For example, the money received as a part of the event 300 may be for a transaction in which the merchant sold goods or services. The goods or services sold may have an ASP, which may be considered high if it exceeds a predefined threshold (or low if it is below a predefined threshold). The feature 311 pertains to what the payment flow is for the event 300. For example, one type of payment flow is that the merchant sent an invoice to a buyer. Another type of payment flow may be that the buyer sent money to the merchant without an invoice being generated. The feature 312 pertains to whether the event 300 is a peer-to-peer (P2P) transaction. The feature 313 pertains to whether the transaction was approved. The event 300 may have other features associated with it, but for reasons of simplicity, only the features 310-313 are listed herein.

In RNN machine learning, each feature may correspond to a dimension, since each feature can take on variables independent of other features or vary in a degree of freedom that is uncorrelated with other features. In the example of FIG. 3, the event 300 has four dimensions, with each of the features 310-313 corresponding to a different dimension. Without collapsing or flattening the dimensions, events such as the event 300 (which has a plurality of dimensions) may make it very difficult for the RNN model to be trained, as doing so would require excess computing resources and may make implementing the RNN model impractical. Furthermore, this problem may be exacerbated when different events may have different sets of features (and thus different dimensions). However, the features each contain valuable information that should not be simply discarded either, as doing so may cause errors or lead to less accuracy with outputs of the model.

To solve this problem, the present disclosure employs an event flattening process, in which all the features of the event are combined or collapsed to generate a refined event, such as the refined event 320. In more detail, each feature is assigned a value, and then all the assigned values are combined to generate the refined event 320, which still contains all the information about the features of the event 300, but is now flattened into a one-dimensional data point. For example, the refined event 320 may correspond to a receiving money event in which the transaction has a high ASP, has a payment flow in which the buyer sent payment directly, where the payment is peer-to-peer, and the transaction was approved.

A refined event code 330 may be generated based on this unique combination of features, and a unique value is assigned for each unique refined event. In this example, a value of 42 is assigned for this refined event code 330. However, had any of the features 310-313 for the event 300 taken on different properties (e.g., the feature 310 indicating that the ASP was not high, or the feature 312 indicating that the payment was not peer-to-peer), then another value (other than 42) would have been assigned to the event code 330 for the refined event 320. In addition, the value assigned to the event code 330 may differ depending on the types of events. For example, a receiving money type of event may have a first set of possible values that can be assigned to its event code, a sending money type of event may have a second set of possible values that can be assigned to its event code, an fund withdrawal type of event may have a third set of possible values that can be assigned to its event code, and an account closing type of event may have a fourth set of possible values that can be assigned to its event code, so on and so forth.

Regardless of how many event codes there are or what values are assigned to them, it can be seen that the generation of the event code(s) effectively compresses the information corresponding to a plurality of different features (and thus a plurality of dimensions) of each event into the event itself, in the form of a refined event with a unique event code value. In that sense, the dimensions are "flattened" or collapsed. According to various aspects of the present disclosure, the event codes for a sequence of events of an entity such as the merchant may constitute a part of the input of the RNN model.

Figure 4:
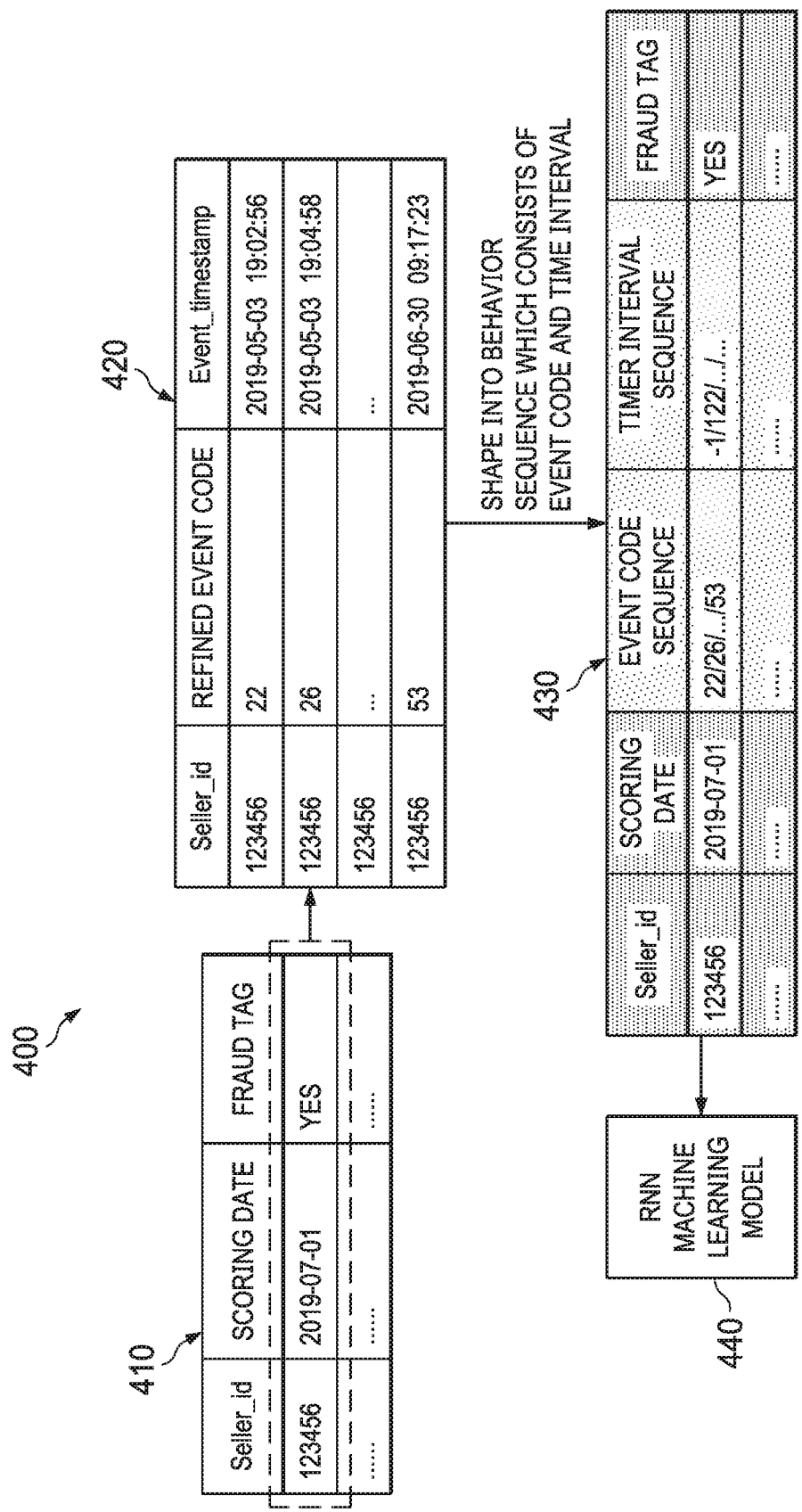
FIG. 4 illustrates a process of training a machine learning model according to various aspects of the present disclosure.

FIG. 4 illustrates a process 400 in which multiple data sequences corresponding to an entity's behavioral data are generated and used to train a machine learning model. At a step 410 of the process 400, an entity's data is accessed via an electronic database. The entity's data may be presented in a table, as shown in FIG. 4. In some embodiments, the entity may be a seller or a merchant on an electronic transaction platform. In other embodiments, the entity may be a buyer on the electronic transaction platform or may be another suitable entity that is neither a seller nor a buyer. As shown in FIG. 4, the entity may have an identification code such as "123456" under the column Seller_id. Other entities may have different identification codes.

A predefined status has already been determined for the entity corresponding to Seller_id of 123456. For example, the predefined status may be or indicate the presence of fraud or the lack thereof, which may be represented by a value of "Yes" under the "Fraud Tag" column. The presence of fraud may be at an account level, or it may be at a transaction level. Of course, the presence of fraud or the lack thereof is merely a non-limiting example of the predefined status. Other examples of the predefined status may include an award, a premium membership, a grant of a request, etc.

The predefined status may be determined on a particular date (e.g., the "Scoring date"), which in this case is 2019 Jul. 1. In some embodiments, the predefined status was determined by the electronic transaction platform. In other embodiments, the predefined status may be determined by another suitable entity. Having knowledge of the predefined status of the entity allows the behavioral data of the entity to be subsequently used for training the RNN model.

At a step 420 of the process 400, data regarding a plurality of events associated with the entity (with the Seller_id of 123456) is extracted. The extracted events occurred within a predefined period, for example, 60 days before the scoring date of 2019 Jul. 1 (in a year-month-date format) on which the fraud tag was placed on the entity. Each event may have one or more features associated therewith, and data pertaining to these features is "flattened" in the same manner as discussed above with reference to FIG. 3.

As a result of the "flattening" process, refined event codes are generated, one for each event. Note that the table corresponding to the step 420 only specifically lists several events (e.g., corresponding to event codes 22, 26, and 53) for reasons of simplicity, but it is understood that the number of events extracted during the predefined time period may be on the order of tens, hundreds, or even thousands. Each extracted event also has a corresponding event timestamp, for example, a timestamp of 2019-05-03 19:02:56 for the event with the event code 22, a timestamp of 2019-05-03 19:04:58 for the event with the event code 26, and a timestamp of 2019-06-30 09:17:23 for the event with the event code 53.

At a step 430 of the process 400, data sequences are generated based on the event codes and the timestamps. For example, a first data sequence may be generated by compiling together all the event codes obtained from the step 420. The first data sequence of event codes would include: the event code having the value 22, the event code having the value 26 . . . and the event code having the value 53. In some embodiments, the event codes in the first data sequence are sorted chronologically based on their respective timestamps.

A second data sequence may be generated as a sequence of time intervals. In more detail, each event may be spaced apart from a preceding event (or from a subsequent event) by a time interval. For example, a time interval of 122 seconds separates the events with the event codes 22 and 26. In some embodiments, in the second data sequence, a preset time interval of −1 second is assigned as the time interval between the first event (e.g., the event corresponding to the event code 22) and its "preceding" event, which does not really exist since the first event is the first event to occur during the predefined time period. In any case, the second data sequence is generated as a sequential listing of the time intervals.

It is understood that the first data sequence and the second data sequence are merely non-limiting examples of data sequences that can be generated based on the behavioral data of the entity. Other data sequences may also be generated based on the behavioral data of the entity. For example, a third data sequence may be generated as a sequence of true or false flags with respect to whether the event was triggered by the entity itself. In that regard, for each corresponding event in the data sequence, the true or false flag may be set to a value of 1 (representing true) if the event was triggered by the entity (e.g., the entity initiated a log out of the account), and the true or false flag may be set to a value of 0 (representing false) if the event was triggered by someone other than the entity (e.g., the electronic transaction platform logged the entity out of its account). For reasons of simplicity, these additional data sequences are not discussed in detail herein.

At a step 440 of the process 400, the first data sequence (e.g., comprising event codes) and the second data sequence (e.g., comprising time intervals) are used as training data to train an RNN machine learning model. In some embodiments, the RNN machine learning model includes an LSTM model, the details of which will be discussed below with reference to FIG. 6. As discussed above, the RNN and/or LSTM models are particularly suited for sequential data, such as the first data sequence and the second data sequence. The present disclosure makes this possible not only by collecting the event data from the entity, but also by compressing the event data (e.g., via the flattening process discussed above) so that the data sequences generated as a result can be the ideal candidates for performing the RNN or LSTM type of machine learning. It is understood that the RNN or LSTM model training may involve the data sequences generated from not just one entity, but a plurality of entities, where each entity has already had a predefined status determined (e.g., being tagged with fraud or not being tagged with fraud).

Figure 5:
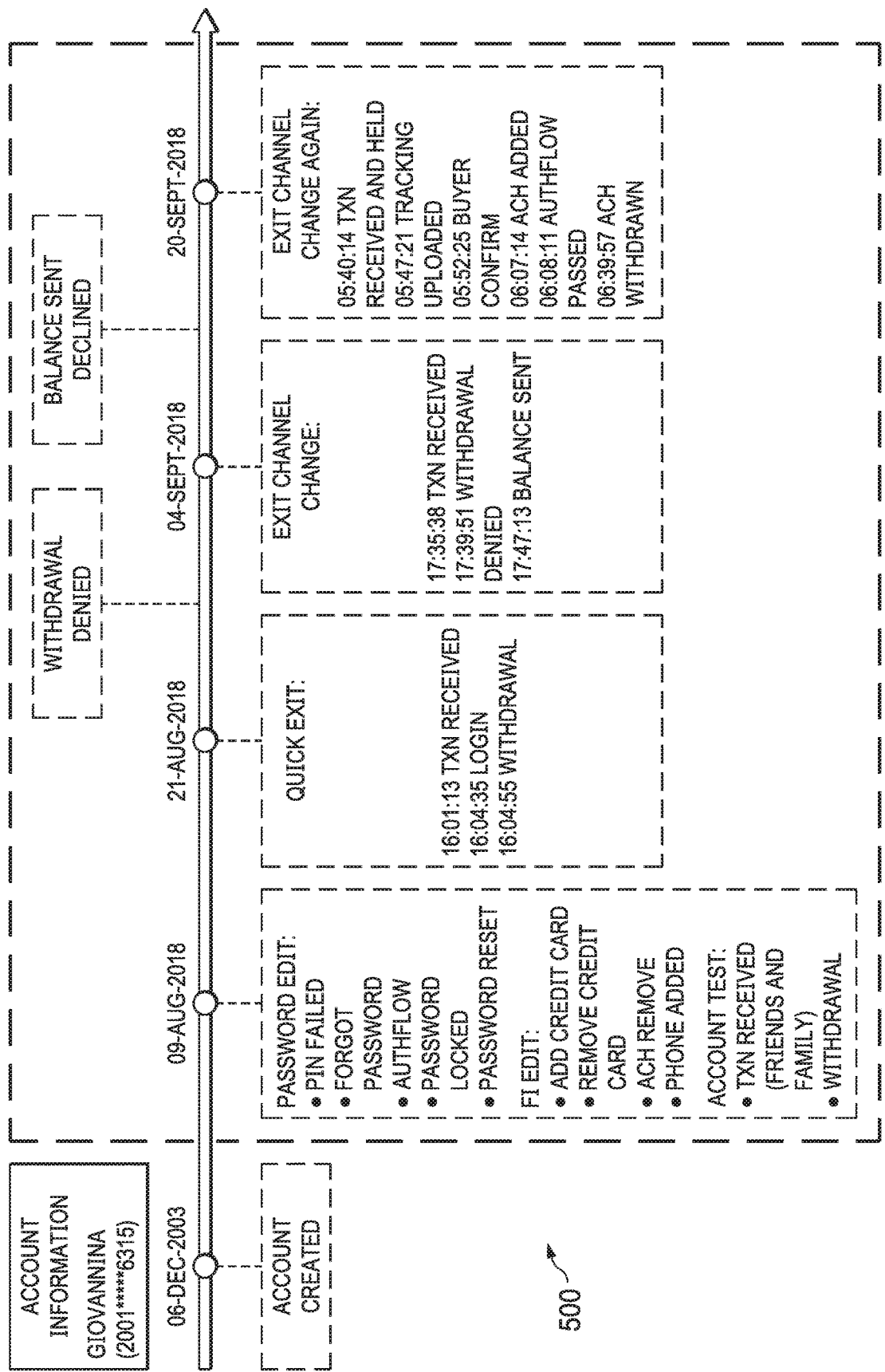
FIG. 5 illustrates a list of activities of an entity over a period of time according to various aspects of the present disclosure.

After the RNN model has been trained, it can be used to make predictions with respect to whether or not another entity has the predefined status. For example, the RNN model may be used to determine whether another entity should be tagged with fraud based on that entity's behavioral data. FIG. 5 illustrates such a process 500. The entity on which the process 500 is performed is a seller named Giovannina with an account number of 2001*****6315. A first event associated with Giovannina occurred on 06-December-2003 (in a day-month-year format), which is an account creation event.

A plurality of events associated with the entity all occurred on 09-August-2018. Some of these events are associated with a password edit. As examples, these events may include: a failed PIN (personal identification number), a forgotten password request, an authentication flow performed to authenticate the user, a locking of the password, and a reset of the password. Some other events are associated with a financial instrument edit. As examples, these events may include: addition of a credit card, removal of another credit card, a removal of an ACH, and an addition of a phone number. Yet some other events are associated with an account test. As examples, these events may include: a transaction is received as a type of transaction from friends and family, and a fund withdrawal.

A plurality of other events associated with the entity occurred on 21-August-2018, which are related to a quick exit. A quick exit may be defined as the entity quickly (e.g., within a predefined amount time) transferring a monetary balance on one of the entity's account (e.g., the account tied to the electronic transaction platform) to another financial instrument of the entity. The events associated with the quick exit may include: at a time of 16:01:13, a transaction is received from the entity; at a time of 16:04:35, the entity logs in; at a time of 16:04:55, the funds are withdrawn from the entity's account.

A plurality of further events associated with the entity occurred on 4 Sep. 2018, which are related to an exit channel change. As examples, the events related to the exit channel change may include: at a time of 17:35:38, a transaction is received from the entity; at a time of 17:39:51, a withdrawal of funds is denied; at a time of 17:47:13, a request is made by the entity to send a balance to another financial instrument of the entity.

A plurality of other events associated with the entity occurred on 20-September-2018, which are related to an exit channel change again. As examples, the events related to the exit channel change again may include: at a time of 05:40:14, a transaction is received and held; at a time of 05:47:21, tracking information for the transaction is uploaded; at a time of 05:52:25, confirmation of the transaction is received from a buyer of the transaction; at a time of 06:07:14, an ACH is added; at a time of 06:08:11, an authentication flow of the entity has been passed; at a time of 06:39:57, the ACH is withdrawn.

Note that these events discussed above are initiated or triggered by the entity. Other events may be triggered by the electronic transaction platform. For example, between 21-August-2018 and 04-September-2018, the electronic transaction platform may deny a withdrawal attempt of the entity (e.g., the withdrawal made by the entity at 16:04:55 on 21-August-2018). Between 04-September-2018 and 20-September-2018, the electronic transaction platform may deny the request from the entity to send the balance (e.g., the request made by the entity at 17:47:13 on 04-September-2018). Although the events are not triggered by the entity, they are still considered a part of the entity's behavioral data, which is used for machine learning herein.

Each of these events discussed above may have one or more features associated therewith, and the features can be compressed into the respective event by the "flattening" process discussed above to generate a data sequence of event codes and a data sequence of time intervals between the events. These data sequences contain information (e.g., embedded in the event codes) regarding the behavioral history of the entity. For example, the behavioral information embedded in the data sequences may indicates a static aspect of the behavioral history, such as: the entity has had a long history of the account (e.g., account created over a certain time period ago), has had multiple transactions (e.g., account has been used for a certain number of transactions over a certain time period), and has a completed profile. The behavioral information embedded in the data sequences may also indicate a dynamic aspect of the behavioral history, such as: the entity reactivated an account that has been dormant for a long time (e.g., between 2003 and 2018), the entity kept changing its profile, and the entity's reaction to being examined by risk policies. These data sequences are then sent to the RNN or LSTM machine learning model as inputs, which has already been trained by now. As an output, the RNN or LSTM model can quickly determine whether the entity should be labeled with the predefined status, for example fraud.

Figure 6:
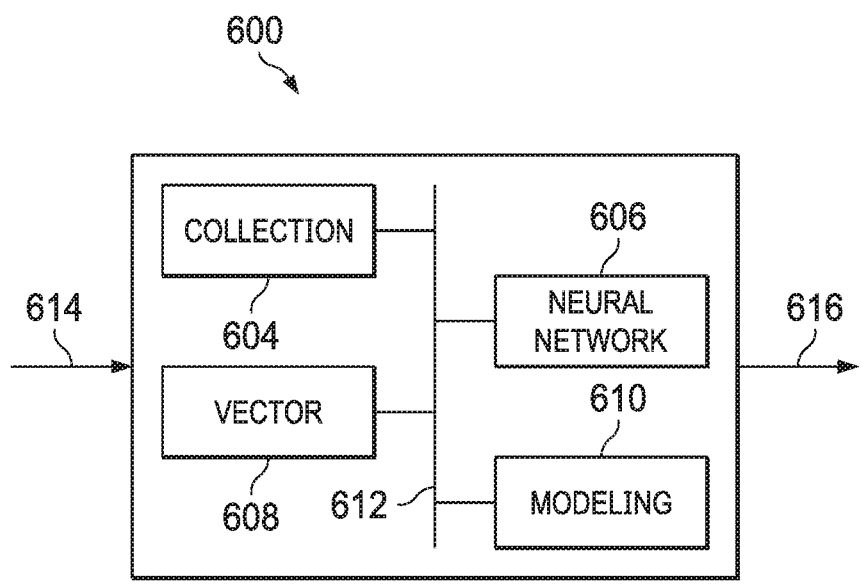
FIG. 6 illustrates an example system involving neural networks according to various aspects of the present disclosure.

FIG. 6 is a block diagram of an example system 600 involving a machine learning neural network according to embodiments of the present disclosure. As shown, the system 600 includes a collection module 604, a neural network 606 that may take the form of a recurrent neural network (RNN) with long short term memory (LSTM), a vector module 608, and a modeling module 610, among other possible modules.

In some embodiments, the collection module 604, the neural network 606, the vector module 608, and the modeling module 610 may take the form of one or more hardware components, such as a processor, an application specific integrated circuit (ASIC), a programmable system-on-chip (SOC), a field-programmable gate array (FPGA), and/or programmable logic devices (PLDs), among other possibilities. As shown, the collection module 604, the neural network 606, the vector module 608, and the modeling module 610 may be coupled to a bus, network, or other connection 612. Further, additional module components may also be coupled to the bus, network, or other connection 612. Yet, it should be noted that any two or more of the collection module 604, the neural network 606, the vector module 608, and the modeling module 610 may be combined to take the form of a single hardware component, such as the programmable SOC. In some embodiments, the system 600 may also include a non-transitory memory configured to store instructions. Yet, further the system 600 may include one or more hardware processors coupled to the non-transitory memory and configured to read the instructions to cause the system 600 to perform operations described herein.

In some embodiments, the system 600 may collect behavioral data 614 from one or more data sources, for example by causing the collection module 604 to collect the behavioral data 614 from one or more data sources. In some instances, the behavioral data 614 may indicate the behavior of an entity or a user as discussed above, such as account logins logouts, transactions conducted, funds withdrawn or sent, and/or other user actions and/or activities.

The one or more data sources may include one or more accessible data sources, possibly including one or more databases and/or data servers in communication with the system 600. The system 600 may collect the behavioral data 614 by accessing one or more databases. Further, the system 600 may learn various user behaviors based on iterations of the collected behavioral data 614 with the neural network 606, possibly taking the form of a RNN with the LSTM. In some instances, the system 600 may customize the iterations with the behavioral data 614 based on various factors, such as the various models generated by the system 600.

Further, the system 600 may determine one or more feature vectors that represent the user behaviors learned by the system 600. For example, the vector module 608 may determine one or more feature vectors that represent the learned user behaviors. The system 600 may generate one or more models 616 that correspond to the learned user behaviors.

In some embodiments, the one or more models 616 may be a contact model used to predict a status of a user based on the behavioral data. In some embodiments, the status may include fraudulent, such as gaining unauthorized accesses to one or more accounts, selling counterfeit goods, or performing unauthorized transactions, fund transfers, exchanges of funds, collections of funds, etc. In some instances, the one or more models 616 generated may include a detection model. As such, the detection model may be configured to detect fraudulent actions by the one or more users.

In some embodiments, the neural network 606, which may be implemented as a recurrent neural network (RNN), and more particularly as a long short-term memory (LSTM), may include an input layer, a hidden layer, and/or an output layer, among other possible layers. In some instances, the system 600 may transfer the collected behavioral data 614 from the input layer to the hidden layer. As such, the collected behavioral data 614 may be converted to second data based on transferring the collected behavioral data 614 from the input layer to the hidden layer. Further, the system 600 may transfer the second data from the hidden layer to the output layer. As such, the second data may convert to third data based on transferring the second data from the hidden layer to the output layer. Yet further, the system 600 may output the third data from the output layer. Yet, in some instances, the third data may be converted to fourth data based on outputting the third data from the output layer. Thus, the system 600 may learn the user behaviors based on the third data and/or the fourth data from the output layer.

Figure 7A:
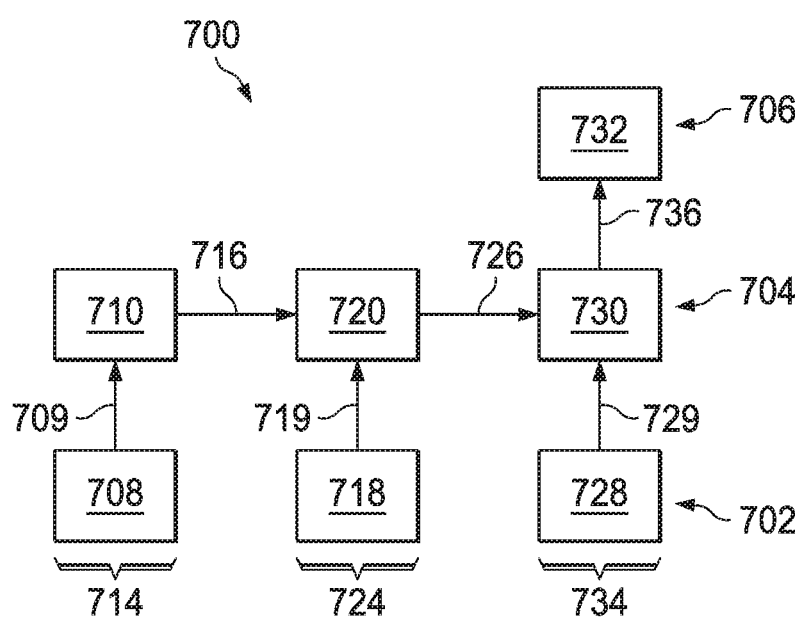

FIG. 7A illustrates an example neural network 700, according to an embodiment. For example, the neural network 700 may take the form of a RNN with the LSTM described above in relation to FIG. 6. As such, the neural network 700, hereinafter interchangeably referred to as the RNN 700, may include an input layer 702, a hidden layer 704, and an output layer 706.

Further, the RNN 700 may include a number of iterations 714, 724, and/or 734. In some instances, the iterations 714, 724, and/or 734 may occur at different times. For example, the iteration 714 may occur, followed by the iteration 724, and then followed by the iteration 734. Yet, in some instances, the iterations 714, 724, and/or 734 may occur substantially simultaneously, among other possibilities.

In some embodiments, the first input nodes 708, the second input nodes 718, and/or the third input nodes 728 may receive input data, such as the collected data 614 described above. For example, the first input nodes 708 may receive a first portion of the collected data 614, the second input nodes 718 may receive a second portion of the collected data 614, and/or the third input nodes 728 may a third portion of the collected data 614. As such, the RNN 700 may determine a first input-layer transfer 709 from the first input nodes 708 to the first hidden nodes 710 of the first iteration 714. Further, the RNN 700 may determine a first hidden-layer transfer 716 from the first hidden nodes 710 of the first iteration 714 to the second hidden nodes 720 of the second iteration 724. In some instances, the first hidden nodes 710 may generate data for the first hidden-layer transfer 716 based on the first input-layer transfer 709 from the first input nodes 708. Yet further, the RNN 700 may determine a second input-layer transfer 719 from the second input nodes 718 of the second iteration 724 to the second hidden nodes 720 of the second iteration 724. Thus, the second hidden nodes 720 may generate data for the second hidden-layer transfer 726 based on the first hidden-layer transfer 716 and/or the second input-layer transfer 719 from the second input nodes 718.

In some embodiments, the RNN 700 may determine a second hidden-layer transfer 726 from the second hidden nodes 720 to third hidden nodes 730 of the third iteration 734. Further, the RNN 700 may determine a third input-layer transfer 729 from the third input nodes 728 of the third iteration 734 to the third hidden nodes 730 of the third iteration 734. Thus, the third hidden nodes 730 may generate data for the output transfer 736 based on the second hidden-layer transfer 726 and/or the third input-layer transfer 729 from the third input nodes 728. In some embodiments, the RNN 700 may determine an output transfer 736 from the third hidden nodes 730 to output nodes 732 of the third iteration 734. As such, the RNN 700 may learn user behaviors based on the output transfer 736 from the third hidden nodes 730 to the output nodes 732.

Notably, the input nodes 708, 718, and/or 728, the hidden nodes 710, 720, and/or 730, and the output nodes 732 may include a number of edges between the nodes. For example, consider a first node, a second node, and a first edge between the first node and the second node. The first edge may correspond with a given weight, such that the output from the first node is multiplied by the given weight and transferred to the second node. Yet further, consider a third node and second edge between the second node and the third node. In such instances, the second edge may correspond to a given weight, possibly different from the weight of the first edge. As such, the output from the second node may be multiplied by the weight associated with the second edge and transferred to the third node, and so on. As such, the weights associated with the input nodes 708, 718, and/or 728, the hidden nodes 710, 720, and/or 730, and the output nodes 732 may vary as the network 700 learns the various user behaviors.

FIG. 7B illustrates an example network node 730, according to an embodiment. As shown, the neural network 700 may include the network nodes 730 that take the form of the third hidden nodes 730 described above in relation to FIG. 7A. In some embodiments, various forms of data may be transferred to the third hidden nodes 730.

In some embodiments, the third hidden nodes 730 may receive a first cell state 740, shown as $C_{t-1}$, based on the second hidden-layer transfer 726 from the second hidden nodes 720 to the third hidden nodes 730. Further, the third hidden nodes 730 may receive an input 742, shown as $w_t$, based on a third input-layer transfer 729 from the third input nodes 728 to the third hidden nodes 730. Yet further, the third hidden nodes 730 may determine a second cell state 746, shown as $C_t$, based on the first cell state 740 and the input 742 from the third input nodes 728, where the output transfer 736 may be determined based on the second cell state 746. In addition, the third hidden nodes 730 may generate an output 748, shown as $h_t$, based on the input 742. As shown, the third hidden nodes 730 may include various sub layers, shown as the input sub layer $G_i$, the hidden sub layer $G_f$, and the output sub layer $G_o$.

FIG. 8A illustrates an example neural network 800, according to an embodiment. As shown, the neural network 800 may include aspects of the neural network 700 described above in relation FIGS. 7A and/or 7B. For example, the neural network 800 includes an input layer 802 that may take the form of the input layer 702 described above. Further, the neural network 800 includes a hidden layer 804 that may take the form of the hidden layer 704 described above. Yet further, the neural network 800 includes an output layer 806 that may take the form of the output layer 706 described above. In addition, as shown, the neural network 800 includes the input nodes 808, the hidden nodes 810, and the output nodes 812, among other possible nodes.

FIG. 8B illustrates an example neural network 800 with a hidden-layer transfer 816, according to an embodiment. As shown, the neural network 800, implemented as an RNN, for example with LSTM, may include aspects of the RNN 700 described above in relation to FIGS. 7A and 7B. For example, the RNN 800 may include the input layer 802, the hidden layer 804, and/or the output layer 806 described above. Further, the RNN 800 may include the first input nodes 808 and the first hidden nodes 810 in the first iteration 814. Yet further, the RNN 800 may perform the first hidden-layer transfer 816 from the first hidden nodes 810 to the second hidden nodes 820. Notably, the RNN 800 may include second input nodes 818, the second hidden nodes 820, and the output nodes 822 in a second iteration 824. As such, the RNN 800 may perform the output transfer 821 from the second hidden nodes 820 to the output nodes 822. As such, the RNN 800 may learn various user behaviors based on one or more models generated with the output nodes 822. For example, the one or more models described above may be generated with output data from the output nodes 822.

Figure 8C:
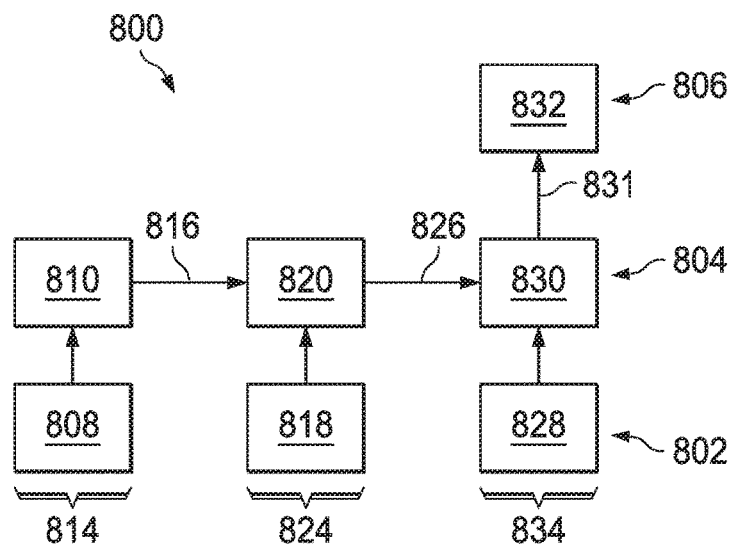

FIG. 8C illustrates an example neural network 800 with a second hidden-layer transfer 826, according to an embodiment. As shown, the RNN 800 with the LSTM may include the input layer 802, the hidden layer 804, and/or the output layer 806 described above. Further, the RNN 800 may include the first input nodes 808 and the first hidden nodes 810 in the first iteration 814. Yet further, the RNN 800 may perform the first hidden-layer transfer 816 from the first hidden nodes 810 to the second hidden nodes 820. Notably, the RNN 800 may include second input nodes 818 and the second hidden nodes 820 in the second iteration 824. Yet further, the RNN 800 may perform the second hidden-layer transfer 826 from the second hidden nodes 820 to the third hidden nodes 830. Notably, the RNN 800 may include third input nodes 328, the third hidden nodes 830, and the output nodes 832 in a third iteration 834. As such, the RNN 800 may learn various user behaviors based on one or more models generated with the output transfer 831 from the third hidden nodes 830 to the output layer 832. For example, the one or more models described above may be generated with output data from the output nodes 832.

Figure 8D:
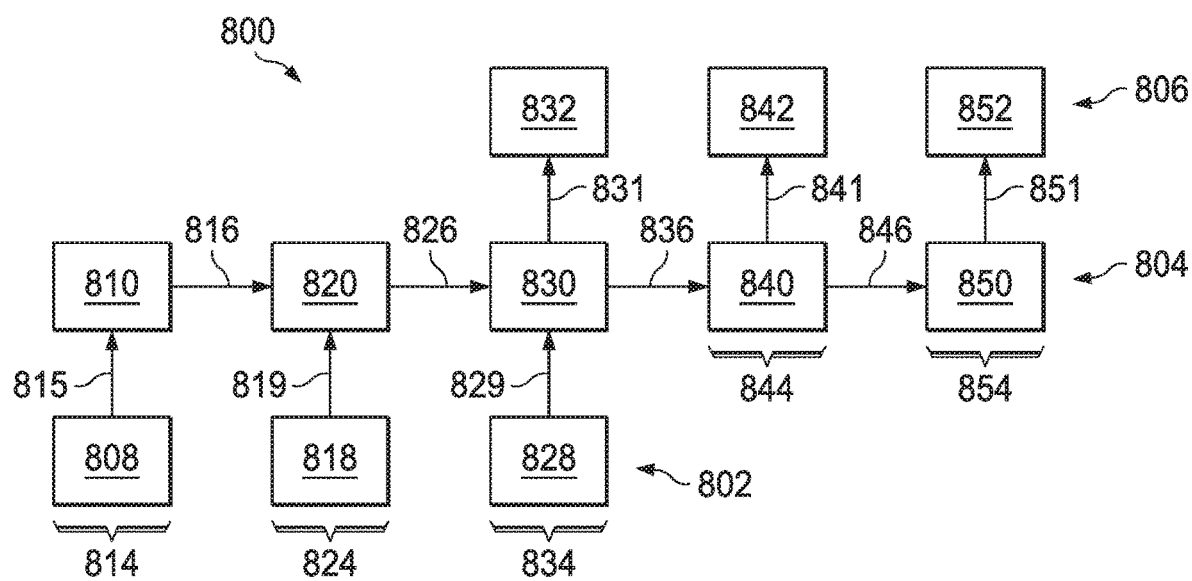

FIG. 8D illustrates an example neural network 800 (e.g., as the RNN or LSTM) with a third hidden-layer transfer 836, according to an embodiment. As shown, the RNN 800 with the LSTM may include the input layer 802, the hidden layer 804, and/or the output layer 806 described above. Further, the RNN 800 may include the first input nodes 808 and the first hidden nodes 810 in the first iteration 814. Yet further, the RNN 800 may determine the first hidden-layer transfer 816 from the first hidden nodes 810 of the first iteration 814 to the second hidden nodes 820 of the second iteration 824. In addition, the RNN 800 may generate data for the first hidden-layer transfer 816 based on the first input transfer 815. Notably, the RNN 800 may include the second input nodes 818 and the second hidden nodes 820 in the second iteration 824.

Yet further, the RNN 800 may determine the second hidden-layer transfer 826 from the second hidden nodes 820 to the third hidden nodes 830 of the third iteration 834. In addition, the RNN 800 may determine a first output transfer 831 from the third hidden nodes 830 to third output nodes 832 of the third iteration 834. As such, the RNN 800 may learn various user behaviors based on one or more models generated with the output nodes 832. For example, the one or more models may be generated with output data from the output nodes 832. Notably, the RNN 800 may include third input nodes 328, the third hidden nodes 830, and the output nodes 832 from the third iteration 834. In some instances, the RNN 800 may generate data for the first output transfer 831 based on the second hidden-layer transfer 826 and a third input transfer 829 from the third input nodes 328 to the third hidden nodes 830 of the third iteration 834. As such, the RNN 800 may learn user behaviors based on the first output transfer 831 from the third hidden nodes 830 to third output nodes 832. For example, the one or more models described above may be generated with output data from the third output nodes 832.

In some embodiments, the RNN 800 may determine a third hidden-layer transfer 836 from the third hidden nodes 830 to fourth hidden nodes 840 of a fourth iteration 844. Further, the RNN 800 may determine a second output transfer 841 from the fourth hidden nodes 840 to fourth output nodes 842 of the fourth iteration 844. In some instances, the RNN 800 may generate data for the second output transfer 841 based on the third hidden-layer transfer 836. As such, the RNN 800 may learn user behaviors based on the second output transfer 841 from fourth hidden nodes 840 to fourth output nodes 842. For example, the one or more models described above may be generated with output data from the output nodes 842.

In some embodiments, the RNN 800 may determine a fourth hidden layer transfer 846 from the fourth hidden nodes 840 to fifth hidden nodes 850 of a fifth iteration 854. Further, the RNN 800 may determine a third output transfer 851 from the fifth hidden nodes 850 to fifth output nodes 852 of the fifth iteration 854. As such, the RNN 800 may learn user behaviors based on the third output transfer 851 from the fifth hidden nodes 850 to fifth output nodes 852. For example, the one or more models described above may be generated with output data from the output nodes 852.

Figure 8E:
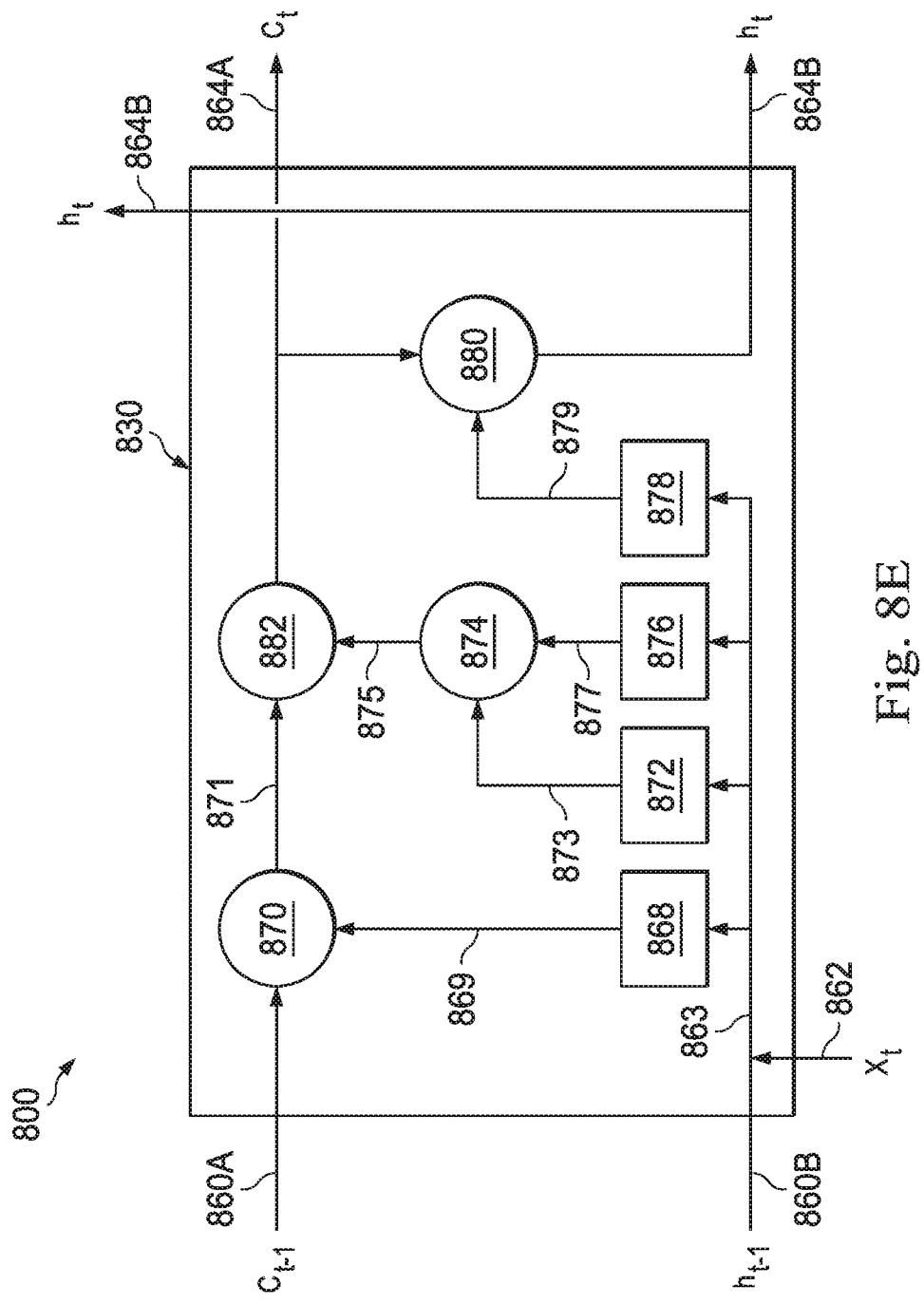

FIG. 8E illustrates example network nodes 830, according to an embodiment. As shown, the neural network 800 may include the network nodes 830 that take the form of the third hidden nodes 730 described above in relation to FIGS. 7A and 7B, and/or further the third hidden nodes 830 described above in relation FIGS. 8C and 8D. In some embodiments, various forms of data may be transferred to the third hidden nodes 830.

In some embodiments, the third hidden nodes 830 may receive a first cell state 860A, shown as $C_{t-1}$, that may take the form of the first cell state 740 described above. Further, the third hidden nodes 830 may receive the input 860B, shown as $h_{t-1}$. In some instances, the first cell state 860A and/or the input 860B may be received based on the second hidden-layer transfer 826 from the second hidden nodes 820 to the third hidden nodes 830. Yet further, the third hidden nodes 830 may receive an input 862, shown as $x_t$, that may take the form of the input 742. The input 862 may be received based on the third input-layer transfer 829 from the third input nodes 328 to the third hidden nodes 830, as described above.

As shown, the input 860B and the input 862 may be concatenated such that the concatenated input 863 is transferred to the sigmoid layers 368, 872, and 878, and also the tanh layer 876. The sigmoid output 869 from the sigmoid layer 368 may be represented by $f_t$ in the following:

$$f_t = \sigma(W_f \cdot [h_{t-1}, x_t] + b_f)$$

As such, the third hidden nodes 830 may transfer the first cell state 860A to the one or more pointwise operations 870 based on the second hidden layer transfer 826. Further, the third hidden nodes 830 may determine the second cell state 864A based on the first cell state 860A transferred to the one or more pointwise operations 870 and further based on one or more layers 868, 872, 876, and/or 878 of the third hidden nodes 830. In particular, the sigmoid output 869 may be transferred to the pointwise operation 870 with the first cell state 860A. The pointwise operation 870 may perform a multiplication operation with the sigmoid output 869 and the first cell state 860 to produce the operation output 871.

The sigmoid output 873 from the sigmoid layer 872 and the tanh output 877 from the tanh layer 876 are transferred to the pointwise operation 874, possibly also a multiplication operation, to produce the operation output 875. The sigmoid output 873 may be represented as $i_t$ and the tanh output 877 may be represented as $C'_t$ in the following:

$$i_t = \sigma(W_i \cdot [h_{t-1}, x_t] + b_i)$$

$$C'_t = \tanh(W_c \cdot [h_{t-1}, x_t] + b_c)$$

The pointwise operation 882 may perform an addition operation with the operation outputs 871 and 875 to produce the second cell state 864A. In particular, based on the sigmoid output 869 ($f_t$), the sigmoid output 873 ($i_t$), and the tanh output 877 ($C'_t$), and the first cell state 860A ($C_{t-1}$), the second cell state 864A is determined. The second cell state 864A is represented by $C_t$ in the following:

$$C_t = f_t * C_{t-1} + i_t * C'_t$$

Further, the sigmoid output 879 from the sigmoid layer 879 may be represented by $o_t$ in the following:

$$o_t = (W_o \cdot [h_{t-1}, x_t] + b_o)$$

As such, the sigmoid output 879 and the second cell state 864 is transferred to the pointwise operation 880, a multiplication operation, to provide the output 864B represented as $h_t$ in the following:

$$h_t = o_t * \tanh(C_t)$$

As such, the user behaviors may be learned based on the output 864B and/or the second cell state 864A.

Figure 9:
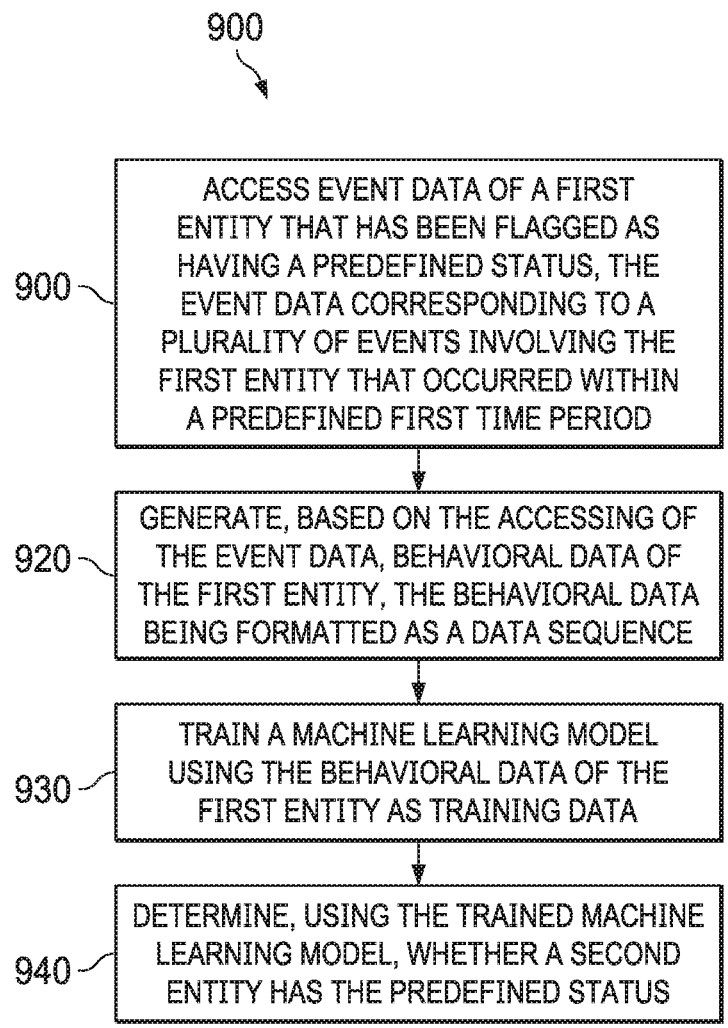
FIG. 9 is a flowchart illustrating a method of machine learning according to various aspects of the present disclosure.

FIG. 9 is a flowchart illustrating a method 900 for performing a machine learning process using behavioral data according to various aspects of the present disclosure. The various steps of the method 900, which are described in greater detail above, may be performed by one or more electronic processors, for example by the processors of a computer of an entity that may include: a payment provider, an operator of an electronic transaction platform, or a business analyst. In some embodiments, at least some of the steps of the method 900 may be performed by the machine learning module 200 discussed above.

The method 900 includes a step 910 to access event data of a first entity that has been flagged as having a predefined status. In some embodiments, the predefined status comprises a presence of fraud. The event data corresponds to a plurality of events involving the first entity that occurred within a predefined first time period. In some embodiments, the step 910 comprises accessing one or more event features of each event. In some embodiments, the first entity comprises a seller or a buyer of an electronic transaction platform.

The method 900 includes a step 920 to generate, based on the accessing of the event data, behavioral data of the first entity. The behavioral data is formatted as a data sequence. In some embodiments, the behavioral data in the data sequence is arranged in a chronological order. In some embodiments, the step 920 comprises generating a first data sequence of the behavioral data, the first data sequence corresponding to a sequence of the plurality of events. In some embodiments, the step 920 comprises generating a second data sequence of the behavioral data, the second data sequence corresponding to a sequence of time intervals between each event and a respective subsequent event of the plurality of events. In some embodiments, the generating the first data sequence comprises generating a sequence of event codes, and wherein a value of each event code corresponds to a unique combination of the one or more event features of the event.

The method 900 includes a step 930 to train a machine learning model using the behavioral data of the first entity as training data. In some embodiments, the training comprises training a Long Short-Term Memory (LSTM) machine learning model.

The method 900 includes a step 940 to determine, using the trained machine learning model, whether a second entity has the predefined status. In some embodiments, the step 940 comprises: accessing event data of the second entity, the event data corresponding to a plurality of further events involving the second entity that occurred within a predefined second time period; generating, based on the accessing of the event data of the second entity, behavioral data of the second entity, the behavioral data of the second entity being formatted as a same type of data sequence as the behavior data of the first entity; inputting the behavioral data of the second entity to the trained machine learning model; and obtaining, as an output of the trained machine learning model, a determination of whether the second entity has the predefined status.

In some embodiments, at least a first subset of the events comprises events initiated by the first entity; and at least a second subset of the events comprises events initiated by another entity other than the first entity.

It is understood that additional method steps may be performed before, during, or after the steps 910-940 discussed above. For example, the method 900 may include a step to make a determination that the first entity has the predefined status. For reasons of simplicity, other additional steps are not discussed in detail herein. In some embodiments, one or more of the steps 910-940 may also be omitted. For example, the step 940 may be omitted in some embodiments. In other words, one entity may perform the process flow corresponding to 910-930 discussed above, and the step 940 may be performed by another entity.

Figure 10:
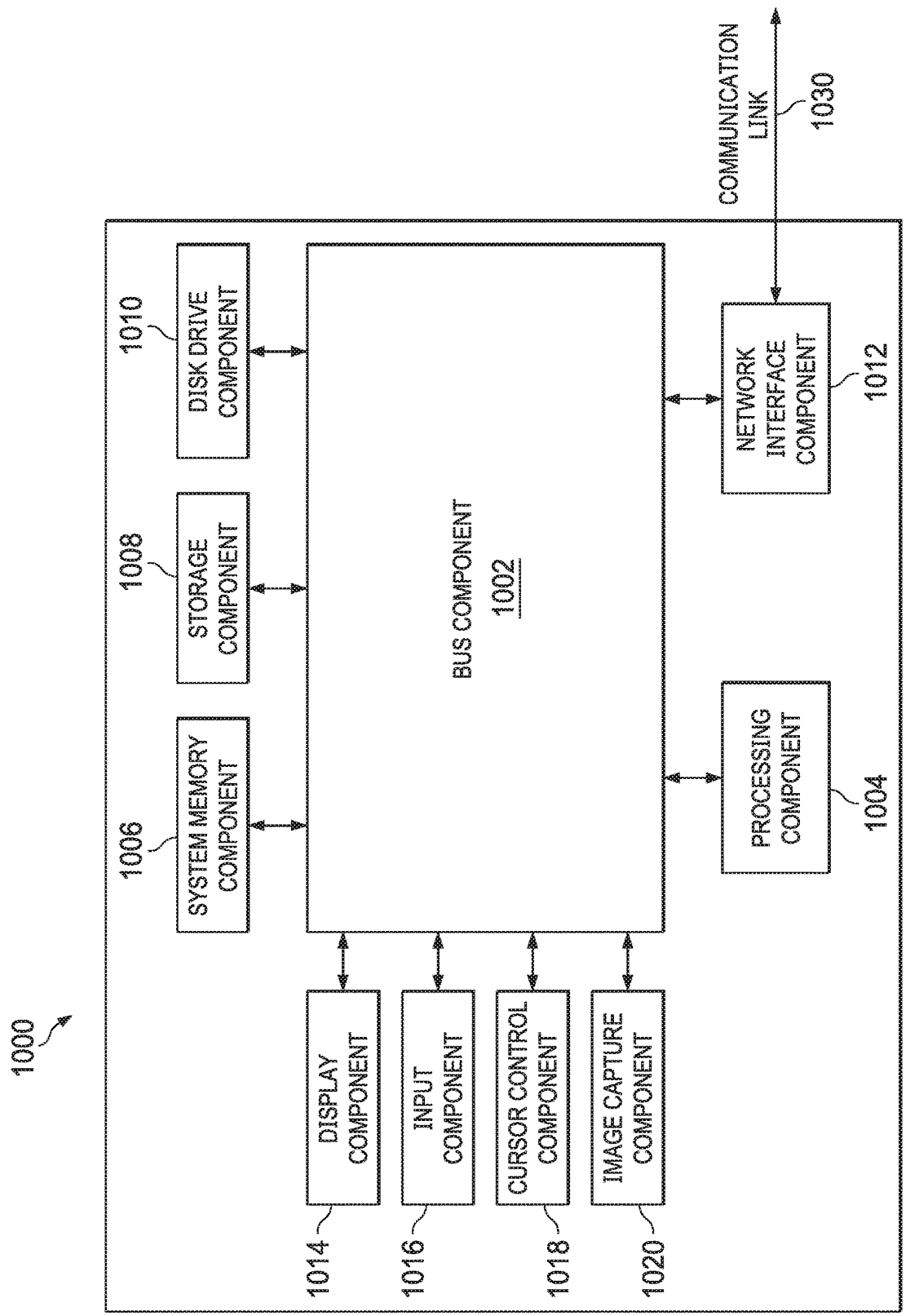
FIG. 10 is an example computer system according to various aspects of the present disclosure.

FIG. 10 is a block diagram of a computer system 1000 suitable for implementing various methods and devices described herein, for example, the machine learning module 200, the user device 110, the merchant server 140, or the payment provider server 170. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the machine learning module 200 and the various method steps of the method 900 discussed above (or the user device 110, the merchant server 140, or the payment provider server 170) may be implemented as the computer system 1000.

In accordance with various embodiments of the present disclosure, the computer system 1000, such as a network server or a mobile communications device, includes a bus component 1002 or other communication mechanisms for communicating information, which interconnects subsystems and components, such as a computer processing component 1004 (e.g., processor, micro-controller, digital signal processor (DSP), etc.), system memory component 1006 (e.g., RAM), static storage component 1008 (e.g., ROM), disk drive component 1010 (e.g., magnetic or optical), network interface component 1012 (e.g., modem or Ethernet card), display component 1014 (e.g., cathode ray tube (CRT) or liquid crystal display (LCD)), input component 1016 (e.g., keyboard), cursor control component 1018 (e.g., mouse or trackball), and image capture component 1020 (e.g., analog or digital camera). In one implementation, disk drive component 1010 may comprise a database having one or more disk drive components.

In accordance with embodiments of the present disclosure, computer system 1000 performs specific operations by the processor 1004 executing one or more sequences of one or more instructions contained in system memory component 1006. Such instructions may be read into system memory component 1006 from another computer readable medium, such as static storage component 1008 or disk drive component 1010. In other embodiments, hard-wired circuitry may be used in place of (or in combination with) software instructions to implement the present disclosure. In some embodiments, the various components of the machine learning module 200 may be in the form of software instructions that can be executed by the processor 1004 to automatically perform context-appropriate tasks on behalf of a user.

Logic may be encoded in a computer readable medium, which may refer to any medium that participates in providing instructions to the processor 1004 for execution. Such a medium may take many forms, including but not limited to, non-volatile media and volatile media. In one embodiment, the computer readable medium is non-transitory. In various implementations, non-volatile media includes optical or magnetic disks, such as disk drive component 1010, and volatile media includes dynamic memory, such as system memory component 1006. In one aspect, data and information related to execution instructions may be transmitted to computer system 1000 via a transmission media, such as in the form of acoustic or light waves, including those generated during radio wave and infrared data communications. In various implementations, transmission media may include coaxial cables, copper wire, and fiber optics, including wires that comprise bus 1002.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the machine learning module 200 discussed above.

In various embodiments of the present disclosure, execution of instruction sequences to practice the present disclosure may be performed by computer system 1000. In various other embodiments of the present disclosure, a plurality of computer systems 1000 coupled by communication link 1030 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 1000 may transmit and receive messages, data, information and instructions, including one or more programs (i.e., application code) through communication link 1030 and communication interface 1012. Received program code may be executed by computer processor 1004 as received and/or stored in disk drive component 1010 or some other non-volatile storage component for execution. The communication link 1030 and/or the communication interface 1012 may be used to conduct electronic communications between the machine learning module 200 and external devices, for example with the user device 110, with the merchant server 140, or with the payment provider server 170, depending on exactly where the machine learning module 200 is implemented.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the machine learning module 200 may be implemented as such software code.

Figure 11:
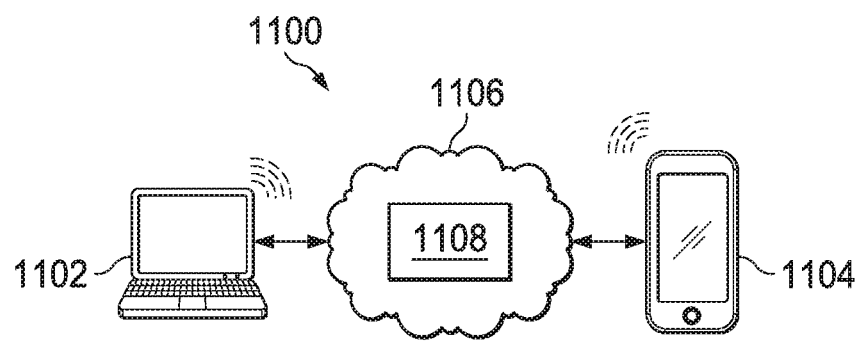
FIG. 11 is a simplified example of a cloud-based computing architecture according to various aspects of the present disclosure.

FIG. 11 illustrates an example cloud-based computing architecture 1100, which may also be used to implement various aspects of the present disclosure. The cloud-based computing architecture 1100 includes a mobile device 1104 (e.g., the user device 110 of FIG. 1) and a computer 1102 (e.g., the merchant server 140 or the payment provider server 1110), both connected to a computer network 1106 (e.g., the Internet or an intranet). In one example, a consumer has the mobile device 1104 that is in communication with cloud-based resources 1108, which may include one or more computers, such as server computers, with adequate memory resources to handle requests from a variety of users. A given embodiment may divide up the functionality between the mobile device 1104 and the cloud-based resources 1108 in any appropriate manner. For example, an app on mobile device 1104 may perform basic input/output interactions with the user, but a majority of the processing may be performed by the cloud-based resources 1108. However, other divisions of responsibility are also possible in various embodiments. In some embodiments, using this cloud architecture, the machine learning module 200 may reside on the merchant server 140 or the payment provider server 1110, but its functionalities can be accessed or utilized by the mobile device 1104, or vice versa.

The cloud-based computing architecture 1100 also includes the personal computer 1102 in communication with the cloud-based resources 1108. In one example, a participating merchant or consumer/user may access information from the cloud-based resources 1108 by logging on to a merchant account or a user account at computer 1102. The system and method for performing the machine learning as discussed above may be implemented at least in part based on the cloud-based computing architecture 1100.

It is understood that the various components of cloud-based computing architecture 1100 are shown as examples only. For instance, a given user may access the cloud-based resources 1108 by a number of devices, not all of the devices being mobile devices. Similarly, a merchant or another user may access the cloud-based resources 1108 from any number of suitable mobile or non-mobile devices. Furthermore, the cloud-based resources 1108 may accommodate many merchants and users in various embodiments.

Based on the above discussions, systems and methods described in the present disclosure offer several significant advantages over conventional methods and systems. It is understood, however, that not all advantages are necessarily discussed in detail herein, different embodiments may offer different advantages, and that no particular advantage is required for all embodiments. One advantage is improved functionality of a computer. For example, conventional computer systems, even with the benefit of machine learning, have not been able to utilize a user or entity's behavioral data to determine the presence of a predefined status or condition. This is because conventional systems have not been able to generate sequential data based on a user's behavior, which is needed for the RNN or LSTM type of machine learning. RNN and LSTM type of machine learning is ideally suited to determine a condition based on a user's behavioral history, since the behavioral history can be presented or formatted as sequential data as an input for the RNN or LSTM model. The present disclosure makes this possible by generating various types of data sequences corresponding to a user's behavioral data, which is then used to train the RNN or LSTM model. The trained model can then be used to determine a condition or status of another user with enhanced accuracy and speed compared to conventional systems.

The inventive ideas of the present disclosure are also integrated into a practical application, for example into the machine learning module 200 discussed above. Such a practical application can generate an output (e.g., a determination of fraud) that is easily understood by a human user, and it is useful in many contexts.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method that includes the following steps: accessing event data of a first entity that has been flagged as having a predefined status, the event data corresponding to a plurality of events involving the first entity that occurred within a predefined first time period; generating, based on the accessing of the event data, behavioral data of the first entity, the behavioral data being formatted as a data sequence; training a machine learning model using the behavioral data of the first entity as training data; and determining, using the trained machine learning model, whether a second entity has the predefined status.

Another aspect of the present disclosure involves a system that includes a non-transitory memory and one or more hardware processors coupled to the non-transitory memory and configured to read instructions from the non-transitory memory to cause the system to perform operations comprising: determining that a first entity has a predefined status; generating, based on activities associated with an account of the first entity, a first behavioral data sequence that includes a plurality of sequentially arranged first data elements; training a Long Short-Term Memory (LSTM) machine learning model, wherein the first behavioral data sequence is used as training data for the training of the LSTM machine learning model; generating, based on activities associated with an account of a second entity, a second behavioral data sequence that includes a plurality of sequentially arranged second data elements; inputting the second behavioral data sequence to the trained LSTM machine learning model; and obtaining, as an output of the trained LSTM machine learning model, a prediction of whether the second entity has the predefined status.

Yet another aspect of the present disclosure involves a non-transitory machine-readable medium having stored thereon machine-readable instructions executable to cause a machine to perform operations comprising: accessing an account of a first user of an electronic transaction platform, wherein the first user has been labeled as having a predefined status, and wherein the account of the first user contains first information regarding a plurality of first events that occurred within a first predefined time period preceding the first user being labeled as having the predefined status; generating, based on the first information, a first data sequence composed of a plurality of first event codes, wherein each first event code represents a respective one of the first events; training a Long Short-Term Memory (LSTM) machine learning model, wherein the first data sequence is used as training data for the training of the LSTM machine learning model; after the LSTM machine learning model has been trained, receiving a request to determine whether a second user of the electronic transaction platform has the predefined status; accessing an account of the second user, wherein the account of the second user contains second information regarding a plurality of second events that occurred within a second predefined time period preceding the receiving of the request; generating, based on the second information, a second data sequence composed of a plurality of second event codes, wherein each second event code represents a respective one of the second events; inputting the second data sequence to the LSTM machine learning model; and obtaining, as an output of the LSTM machine learning model, a determination of whether the second user has the predefined status.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
    accessing, via one or more hardware processors, event data of a first entity that has been flagged as having a predefined status, the event data corresponding to a plurality of first events involving the first entity that occurred within a predefined first time period;
    generating, via the one or more hardware processors based on the event data, behavioral data of the first entity, the behavioral data of the first entity formatted as a data sequence, wherein the generating the behavioral data of the first entity includes generating, as a part of the behavioral data of the first entity, a first data sequence that corresponds to a sequence of the plurality of first events and that includes a sequence of event codes, and wherein a value of each event code corresponds to a unique combination of one or more event features of the plurality of first events;
    training, via the one or more hardware processors, a machine learning model using the behavioral data of the first entity as training data, wherein the machine learning model comprises a Long Short-Term Memory (LSTM) machine learning model; and
    determining, via the one or more hardware processors using the trained machine learning model, whether a second entity has the predefined status, wherein the determining comprises:
        accessing event data of the second entity, the event data corresponding to a plurality of second events involving the second entity that occurred within a predefined second time period;
        generating, based on the event data of the second entity, behavioral data of the second entity, the behavioral data of the second entity formatted as a same type of data sequence as the behavior data of the first entity;
        inputting the behavioral data of the second entity to the trained machine learning model; and
        obtaining, as an output of the trained machine learning model, a determination of whether the second entity has the predefined status.

2. The method of claim 1, wherein the generating the behavioral data of the first entity further comprises: generating a second data sequence of the behavioral data of the first entity, the second data sequence corresponding to a sequence of time intervals between each event and a respective subsequent event of the plurality of first events.

3. The method of claim 1, wherein the accessing the event data of the first entity comprises accessing the one or more event features of each event of the plurality of first events.

4. The method of claim 1, wherein the behavioral data of the first entity in the data sequence is arranged in a chronological order.

5. The method of claim 1, wherein the predefined status comprises a presence of fraud.

6. The method of claim 1, wherein the first entity comprises a seller or a buyer processing a transaction on an electronic transaction platform.

7. The method of claim 1, wherein:
    at least a first subset of the plurality of first events comprises events initiated by the first entity; and
    at least a second subset of the plurality of first events comprises events initiated by another entity other than the first entity.

8. The method of claim 1, further comprising performing an event flattening process that combines the one or more event features into a single refined event.

9. A system, comprising:
a non-transitory memory; and
one or more hardware processors coupled to the non-transitory memory and configured to read instructions from the non-transitory memory to cause the system to perform operations comprising:
accessing event data of a first entity that has been flagged as having a predefined status, the event data corresponding to a plurality of first events involving the first entity that occurred within a predefined first time period, wherein one or more event features of the plurality of first events are accessed by the accessing of the event data;
generating, based on the event data, behavioral data of the first entity, the behavioral data of the first entity formatted as a data sequence, wherein the data sequence comprises a first data sequence that corresponds to a sequence of the plurality of first events and that includes a sequence of event codes, and wherein a value of each event code corresponds to a unique combination of the one or more event features of the plurality of first events;
accessing a machine learning model trained using the behavioral data of the first entity as training data, wherein the machine learning model comprises a Long Short-Term Memory (LSTM) machine learning model;
accessing event data of a second entity, the event data of the second entity corresponding to a plurality of second events involving the second entity that occurred within a predefined second time period;
generating, based on the event data of the second entity, behavioral data of the second entity, the behavioral data of the second entity formatted as a same type of data sequence as the behavior data of the first entity;
inputting the behavioral data of the second entity to the trained machine learning model; and
obtaining, as an output of the trained machine learning model, a determination of whether the second entity has the predefined status.

10. The system of claim 9, wherein the generating the behavioral data of the first entity further comprises:
generating a second data sequence of the behavioral data of the first entity, the second data sequence corresponding to a sequence of time intervals between each event of the plurality of first events and a respective subsequent event of the plurality of first events.

11. The system of claim 9, wherein the behavioral data of the first entity in the data sequence is arranged in a chronological order, and wherein the predefined status comprises a presence of fraud.

12. The system of claim 9, wherein the operations further comprise performing an event flattening process that combines the one or more event features into a single refined event.

13. The system of claim 9, wherein the first entity comprises a seller or a buyer processing a transaction on an electronic transaction platform.

14. The system of claim 9, wherein:
at least a first subset of the plurality of first events comprises events initiated by the first entity; and
at least a second subset of the plurality of first events comprises events initiated by another entity other than the first entity.

15. A non-transitory machine-readable medium having stored thereon machine-readable instructions executable to cause a machine to perform operations comprising:
accessing event data of a first entity that has been flagged as being associated with fraud, the event data corresponding to a plurality of first events involving the first entity that occurred within a predefined first time period, wherein the accessing the event data of the first entity comprises accessing one or more event features of at least some of the plurality of first events;
generating, based on the event data, behavioral data of the first entity, the behavioral data of the first entity formatted as a data sequence that corresponds to a sequence of the plurality of first events, wherein the data sequence includes a sequence of event codes, and wherein a value of each event code corresponds to a unique combination of the one or more event features of the plurality of first events;
accessing a Long Short-Term Memory (LSTM) machine learning model trained using the behavioral data of the first entity as training data;
accessing event data of a second entity, the event data of the second entity corresponding to a plurality of second events involving the second entity that occurred within a predefined second time period;
generating, based on the event data of the second entity, behavioral data of the second entity, the behavioral data of the second entity formatted as a same type of data sequence as the behavior data of the first entity;
inputting the behavioral data of the second entity to the LSTM machine learning model; and
obtaining, as an output of the LSTM machine learning model, a determination of whether the second entity is associated with the fraud.

16. The non-transitory machine-readable medium of claim 15, wherein the behavioral data of the first entity in the data sequence is arranged in a chronological order.

17. The non-transitory machine-readable medium of claim 15, wherein a subset, but not all, of the plurality of first events are initiated by the first entity.

18. The non-transitory machine-readable medium of claim 15, wherein multiple data sequences including the data sequence are generated as representations of the behavioral data of the first entity, and wherein at least one of the multiple data sequences is generated as a sequence of true or false flags.

19. The non-transitory machine-readable medium of claim 15, wherein the operations further comprise performing an event flattening process that combines the one or more event features into a single refined event.

20. The non-transitory machine-readable medium of claim 15, wherein the first entity comprises a seller or a buyer processing a transaction on an electronic transaction platform.

* * * * *